US011939795B2

(12) United States Patent
Corbetta

(10) Patent No.: US 11,939,795 B2
(45) Date of Patent: Mar. 26, 2024

(54) SELECTIVE LOCKING ASSEMBLY OF EXTRACTABLE COMPONENTS SUCH AS FURNITURE DRAWERS

(71) Applicant: Emidio Corbetta, Conegliano (IT)

(72) Inventor: Emidio Corbetta, Conegliano (IT)

( * ) Notice: Subject to any disclaimer, the term of this patent is extended or adjusted under 35 U.S.C. 154(b) by 87 days.

(21) Appl. No.: 17/739,627

(22) Filed: May 9, 2022

(65) Prior Publication Data

US 2022/0372796 A1 Nov. 24, 2022

(30) Foreign Application Priority Data

May 18, 2021 (IT) ........................ 102021000012800

(51) Int. Cl.
*E05B 65/463* (2017.01)
*E05B 65/465* (2017.01)
*E05B 65/466* (2017.01)

(52) U.S. Cl.
CPC .......... *E05B 65/466* (2013.01); *E05B 65/465* (2013.01)

(58) Field of Classification Search
CPC ..... E05B 65/463; E05B 65/465; E05B 65/466
USPC ...................................... 312/107.5, 216, 221
See application file for complete search history.

(56) References Cited

U.S. PATENT DOCUMENTS 1,031,751 A 7/1912 Weiss
1,036,345 A * 8/1912 Sampson ............... A47B 47/04 312/107.5
1,036,442 A * 8/1912 Bullock .............. E05B 65/0003 312/107.5
1,486,094 A * 3/1924 Lehman .............. E05B 65/0003 235/22
4,077,684 A 3/1978 Scherrer
4,394,056 A 7/1983 Janke
2010/0148648 A1 6/2010 Green

FOREIGN PATENT DOCUMENTS

EP 0 658 673 A1 6/1995
EP 0 815 776 A1 1/1998
FR 2 542 179 A1 9/1984
IT 1225516 B 11/1990

OTHER PUBLICATIONS

Feb. 1, 2022 Search Report and Written Opinion issued in Italian Patent Application No. 202100012800.

* cited by examiner

*Primary Examiner* — James O Hansen
(74) *Attorney, Agent, or Firm* — Oliff PLC

(57) ABSTRACT

A selective locking assembly of extractable components prevents the simultaneous extraction of several drawers. The selective locking assembly includes at least one pair of actuating devices formed by at least one rigid elongated element extending horizontally and arranged so as to be axially rotatable in proximity to a back wall of the drawers, each actuating device being operatively associable with a corresponding drawer through a first coupling device and being also equipped, at drawers not associated therewith, with a stop device arranged and selectively cooperates with the drawers to prevent/allow extraction, each actuating device being adapted to be rotatably displaced, in response to the extraction movement of the drawer to which it is associated, from a first position, wherein the stop device allows the extraction of any of the drawers, to a second position wherein the stop device interacts with the other drawers to prevent the extraction thereof.

11 Claims, 12 Drawing Sheets

SELECTIVE LOCKING ASSEMBLY OF EXTRACTABLE COMPONENTS SUCH AS FURNITURE DRAWERS

TECHNICAL FIELD OF THE INVENTION

The present invention relates to an assembly for the selective locking of extractable components, such as drawers or baskets for example of pieces of furniture, adapted to prevent the simultaneous opening of several drawers at a time.

BACKGROUND OF THE INVENTION

Assemblies for the selective locking of drawers of pieces of furniture which can be used particularly in chests of drawers for specific purposes, such as for example filing cabinets or office furniture, that is pieces of furniture provided with a plurality of drawers which are superimposed vertically and extractable with a movement along an essentially horizontal direction, so as prevent it from tipping over, are generally known.

As a matter of fact, especially if drawers are loaded with particularly heavy objects, the piece of furniture could inadvertently and undesirably tip over should several drawers be opened simultaneously, with unpleasant consequences both for the contents of the drawers which could be damaged and for the safety of the users.

An example of such assembly is described in the Italian patent IT1225516 and it comprises a rod positioned at the rear part of the piece of furniture and vertically hinged to the structure thereof. Fixed on the rear part of each drawer is a plate integrally joined therewith and provided with a slot formed by a pair of segments arranged with an angled arrangement, adapted to receive the rod.

When opening a drawer, the slot obtained on the relative plate causes an axial rotation of the rod, which is engaged in the slots of the plates of the other drawers, preventing the extraction thereof.

When closing the previously opened drawer, due to the inclination of the slot, the plate interferes with the rod, causing the rotation thereof in the opposite direction, so as to return it to the initial condition.

However, this system can only be used in pieces of furniture wherein there is a plurality of vertically superimposed drawers.

On the other hand, as regards the assemblies for the selective locking of the extraction of drawers arranged side by side, some examples are shown in documents U.S. Pat. No. 4,077,684 and US2010/0148648: however, such documents relate to assemblies that can be positioned inside a cavity obtained between a pair of drawers directly arranged side by side.

Patent EP0815776 instead shows a system for preventing the simultaneous opening of drawers of a piece of furniture which can be arranged superimposed and/or side by side, comprising a plurality of rotatable vertical bars, whose rotation is synchronised by means of a coupling mechanism formed by levers interconnected by means of a thrust rod, and on which there are keyed actuation elements and locking elements adapted to cooperate with pins integrally joined with the drawers.

The main task of the present invention is to provide an assembly for the selective locking of extractable components, such as particularly at least one pair of drawers or baskets for example of a piece of furniture arranged side by side, which allows the extraction of a single drawer at a time.

Another object of the present invention is to provide a selective locking assembly that is reliable and extremely flexible, being easily adapted to operate with a plurality of drawers arranged side by side.

A further object of the present invention is to provide a selective locking assembly that can be used even in the case of presence of at least one drawer superimposed with respect to the underlying drawers arranged side by side.

Still another object of the present invention lies in providing a selective locking assembly that can operate even to control the extraction of a drawer housed in a respective casing, such as for example a household appliance.

Lastly, an object of the present invention is to provide an assembly that attains the task and objects mentioned above at competitive production costs, so that the use thereof is advantageous also from the economic point of view, and which can be obtained using the usual and known installations, machines and equipment.

The task and the objects outlined above, as well as others which will be more apparent hereinafter, are attained by an assembly for the selective locking of extractable components as defined in claim 1. Further advantageous characteristics of the assembly according to the present invention are further provided for in the subsequent claims.

BRIEF DESCRIPTION OF THE FIGURES

Advantages and characteristics of the invention will be apparent from the following description, provided by way of non-limiting example, with reference to the attached figures, wherein.

DETAILED DESCRIPTION OF THE INVENTION

Figure 1:
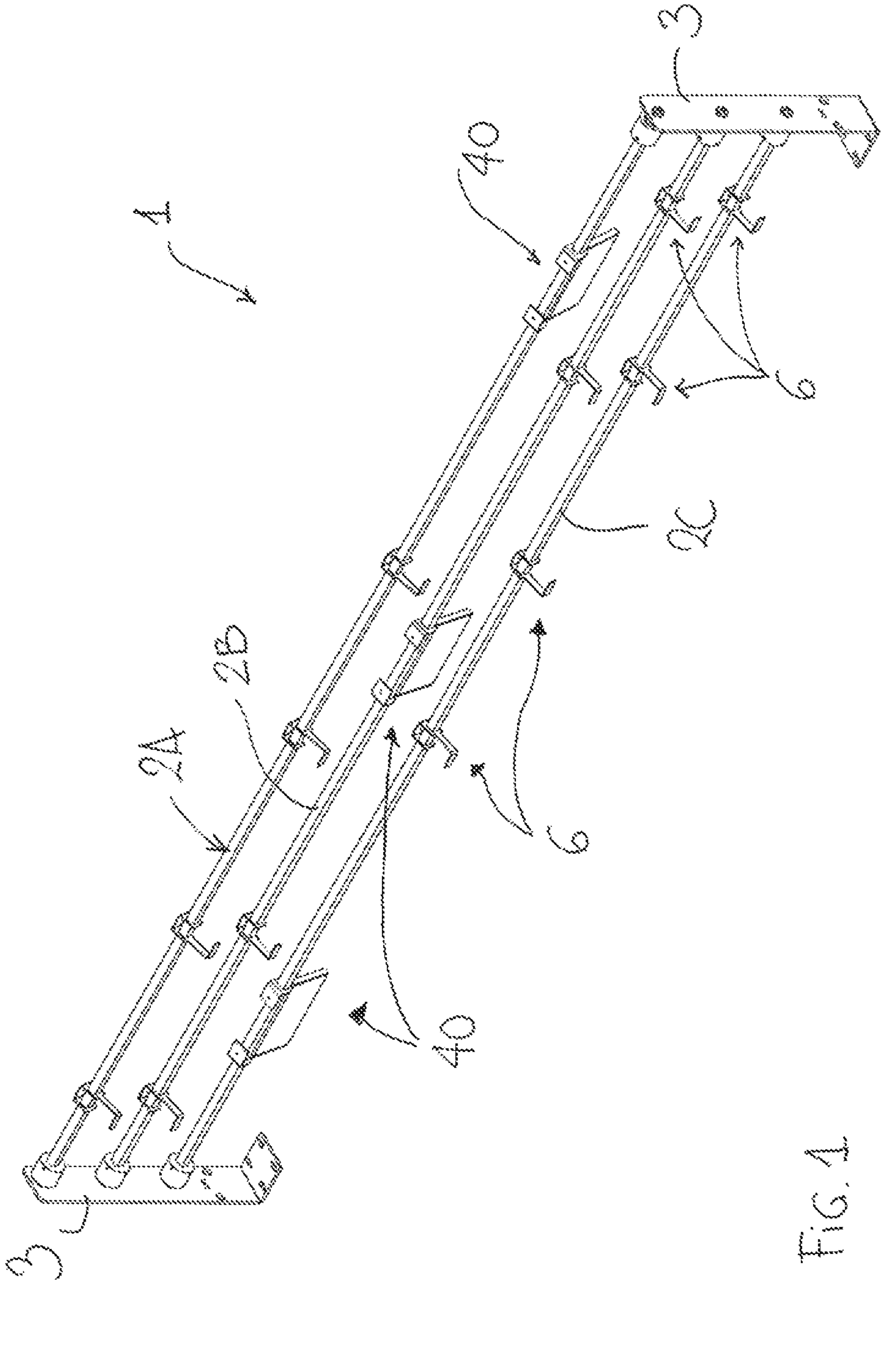
FIG. 1 shows, with a front perspective view, an assembly for the selective locking of extractable components according to a first embodiment of the present invention.

With reference to the figures mentioned above, it is shown an assembly for the selective locking of extractable components, adapted to allow the extraction of a single element at a time, that is—in other words—adapted to prevent the simultaneous extraction of several extractable components at a time with respect to a containing structure, such as for example the structure of a piece of furniture.

In particular, said selective locking assembly comprises a mechanism adapted to cooperate with at least one pair of drawers or "baskets" laterally arranged side by side on the same row, that is along a horizontal strip having the same height with respect to an essentially horizontal reference plane, which can be displaced along a parallel direction with respect to said reference plane to switch between a closing position, wherein they are essentially retracted into the structure of the piece of furniture and therefore without allowing access to the content thereof, and an opening position, wherein they are at least partially extracted in a cantilevered fashion with respect to the structure of the piece of furniture, so as to allow access to the content thereof.

Preferably, said piece of furniture is a base for a kitchen, living room or bathroom, resting on said reference plane.

In particular, said drawers comprise at least one back wall essentially vertical and facing towards the rear part of the piece of furniture, and they are preferably provided with a bottom wall and a pair of side walls that are parallel and facing each other, to define a containing compartment in which various kinds of objects can be arranged; furthermore, advantageously, said drawers are provided with a front wall, facing outside the structure of the piece of furniture, possibly provided with gripping means such as for example a handle through which the drawer can be displaced between the retracted position and an extracted position. Said drawers are moved through known and conventional support and guide means associated with the structure of the piece of furniture.

The drawers belonging to the same row may be directly arranged side by side, and therefore adjacent, or indirectly arranged side by side, that is with other components that cannot be controlled by the assembly, such as for example shelves, closable compartments with rotatable door leaves or household appliances, arranged between them.

Generally, an assembly 1 according to the present invention comprises at least one pair of actuating means, each formed by at least one rigid elongated element, such as for example a bar or a rod, extending horizontally and mounted in a freely axially rotatable fashion through hinge means on support means 3, such as for example a pair of brackets which can be constrained to the inner surface of the sides of the piece of furniture, between which said bars extend, advantageously in the rear part of the structure of the piece of furniture and in proximity of the back wall of said drawers.

Advantageously, said actuating means are provided for in a number equal to the number of drawers whose opening is designed to selectively block.

Furthermore, preferably, said actuating means rest on the same vertical plane.

Each actuating means is operatively associated with a corresponding drawer through first coupling means, and it is also provided with stop means, arranged at drawers not associated therewith, adapted to selectively cooperate with said drawers to allow/prevent the opening thereof, as explained in greater detail below.

Preferably, said stop means are adapted to selectively cooperate with corresponding engaging means provided for on the back walls of said drawers.

In particular, each actuating means is adapted to be rotatably displaced, in response to the extraction movement of the drawer to which it is associated, from a first position, wherein the stop means are de-coupled from the drawers, allowing the extraction of any of the drawers, to a second position, wherein the stop means cooperate with said engaging means provided for on the other drawers, that is the drawers not associated therewith, preventing the extraction thereof.

Advantageously, said coupling means comprise a reference member, such as for example a pin integrally joined with the relative drawer and advantageously protruding from a rear surface of the back wall of said drawer, and an abutment body rotatably mounted—integrally joined therewith or keyed thereto—on the respective actuating means and adapted to interact with said reference pin to allow the displacement of said actuating means between said first and said second position.

In particular, advantageously, said first coupling means are arranged and configured so that when the relative drawer is in the retracted position, the reference pin cooperates or interacts with said abutment element to maintain said actuating means in said first position, and when the drawer is moved to the extracted position, the reference pin is de-coupled from the abutment element so that the actuating means move to the second position.

Preferably, said abutment body is formed by a rigid plate constrained in a cantilevered fashion to the relative actuating means, and the corresponding reference pin is adapted to abut against said abutment plate to carry and maintain the actuating means to/in the first position. As soon as the reference pin moves away from the surface of the abutment plate, in response to the extraction of the relative drawer, the latter therefore moves—by gravity—to rest on a vertical plane, driving the corresponding actuating means in rotation too.

Alternatively or additionally, a magnet adapted to magnetically interact with the material forming said abutment body may be provided for on the free end of said reference pins.

Figure 2:
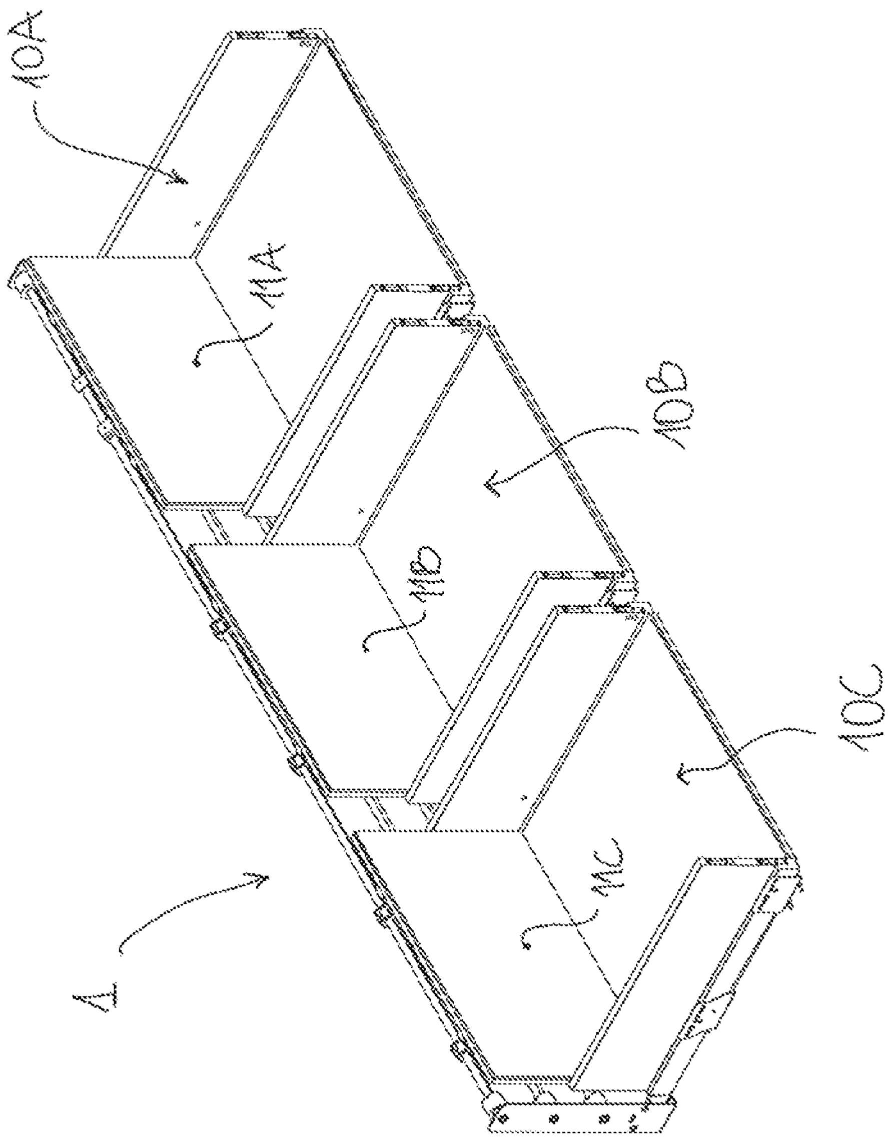
FIG. 2 shows, with a front perspective view, an assembly for the selective locking of extractable components according to a first embodiment of the present invention when applied to a plurality of extractable components of a piece of furniture arranged side by side in a first condition, that is with all drawers in retracted position.

With reference to FIG. 1, shown therein is a first embodiment of the assembly 1 according to the present invention, which can be advantageously associated with three drawers 10A, 10B, 10C directly arranged side by side and arranged on a first row, as shown in FIG. 2.

Therefore, the assembly 1 comprises three actuating means 2A, 2B, 2C, each formed by a single bar or rod horizontally hinged at a rear area of the drawers so as to be freely axially rotatable, and operatively associated with a respective drawer 10A, 10B, 10C through said first coupling means 40.

Specifically, each drawer 10A, 10B, 10C is provided with a back wall 11A, 11B, 11C from which there protrudes a reference pin 4A, 4B, 4C, adapted to interact with an abutment plate 5A, 5B, 5C keyed on the respective actuating means 2A, 2B, 2C.

Besides the abutment plate, which is arranged at the drawer to which it is associated, each actuating means 2A, 2B, 2C is further equipped, at the other drawers, with stop means 6, rotatable integrally joined therewith and adapted to selectively cooperate with said drawers to prevent/allow the extraction thereof. Preferably, as shown in the figures, said stop means 6 are formed by L-shaped elements and said engaging means 7 comprise appropriate seats or undercuts obtained on the rear surfaces of the back walls 11A, 11B, 11C of said drawers.

The operation of a selective locking assembly 1 according to this first embodiment of the present invention is described with reference to FIGS. 3A and 3B.

Figure 3A:
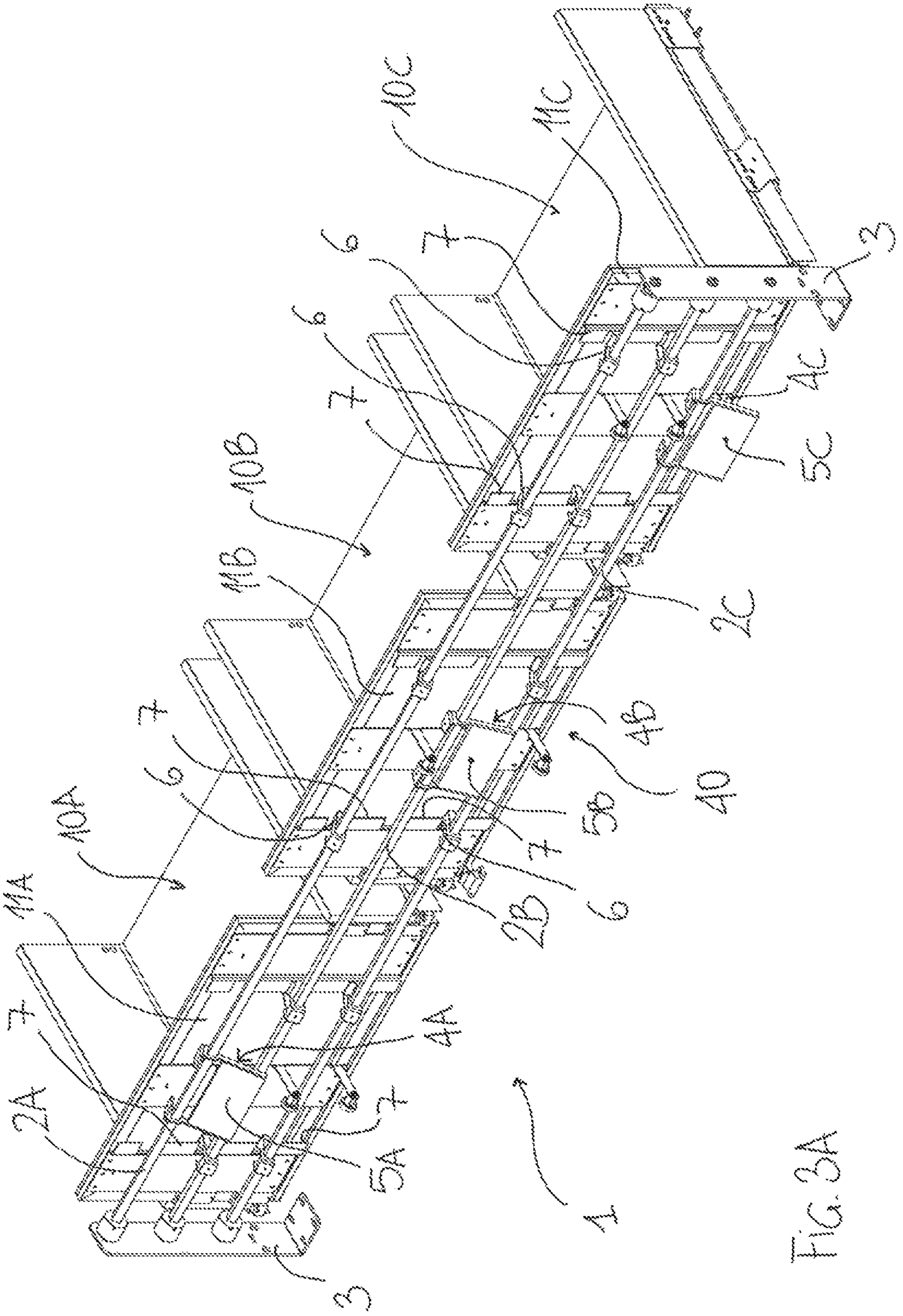
FIGS. 3A and 3B show, with a rear perspective view, an assembly for the selective locking of extractable components according to a first embodiment of the present invention when applied to a plurality of extractable components of a piece of furniture arranged side by side respectively in a first condition, that is with all extractable components in retracted position, and in a second condition, that with only one extractable component extracted.

In an initial starting condition, shown in FIG. 3A, the drawers 10A, 10B, 10C are arranged in a retracted position. In such condition, the relative backs of the drawers are essentially approached to the actuating means 2A, 2B, 2C and the reference pins 4A, 4B, 4C rest abutting against the relative abutment plates 5A, 5B, 5C, therefore maintaining them in a first position or initial position, wherein they are inclined with respect to a vertical plane, and causing a resulting rotation of the respective actuating means 2A, 2B, 2C.

Therefore, in such condition, the stop means 6 are arranged in a disengagement position with respect to the drawers 10A, 10B, 10C, therefore allowing the extraction movement of any one of them.

Figure 3B:
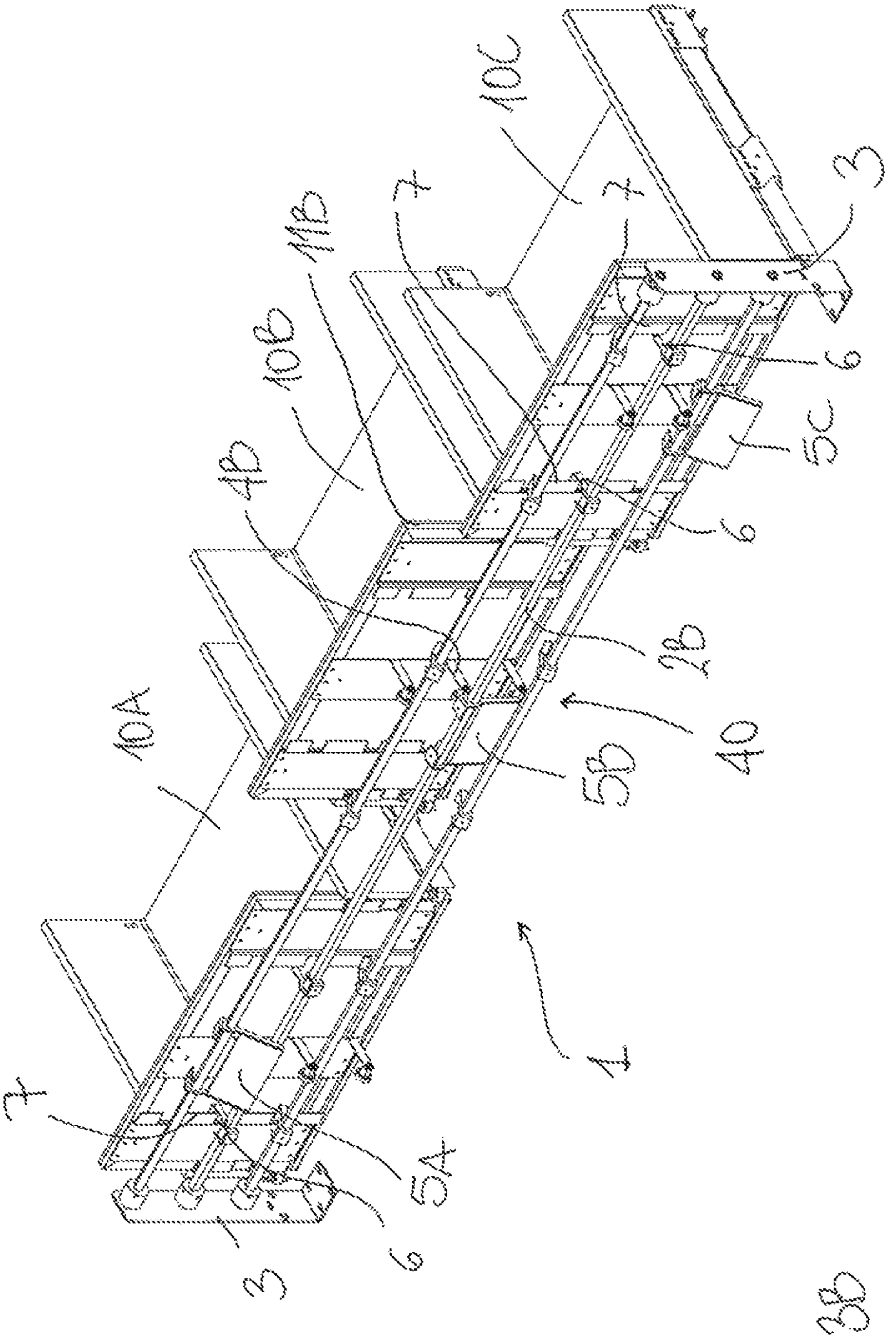

When a user wishes to open one of said drawers 10A, 10B, 10C—drawer 10B in the example shown in FIG. 3B—the user applies a pulling force thereon, for example acting on gripping means, such as a handle, or through other known and conventional means, causing an extraction movement thereof along a horizontal direction.

As the drawer 10B is progressively pulled toward an extracted position, the corresponding reference pin 4B progressively moves away from the relative abutment plate 5B, until full detachment thereof is reached: the latter, due to the weight thereof, tends to move—by gravity—to a second position, wherein it rests on a vertical plane, therefore driving the respective actuating means 2B to which it is connected in rotation too.

The axial rotation of the actuating means 2B rotatably displaces the stop means 6 mounted integrally joined therewith and associated with the drawers 10A, 10C which remained in the retracted position; said stop means 6 therefore move to an engagement position, for example being inserted into engaging undercuts 7 provided for on the back walls of the drawers, therefore blocking the extraction of such drawers 10A, 10C.

When the previously extracted drawer 10B is returned toward the retracted position, the reference pin 4B associated therewith impacts against the corresponding abutment plate 5B, which is constrained to the relative actuating means 2B; this causes the rotatable displacement of the abutment plate toward the first position, causing the axial rotation of the actuating means 2B and therefore also of the stop means 6 integrally joined therewith, which return to the disengagement position with respect to the drawers, therefore restoring the initial starting condition in which the extraction of any one of the drawers 10A, 10B, 10C of the piece of furniture is allowed.

Figure 4A:
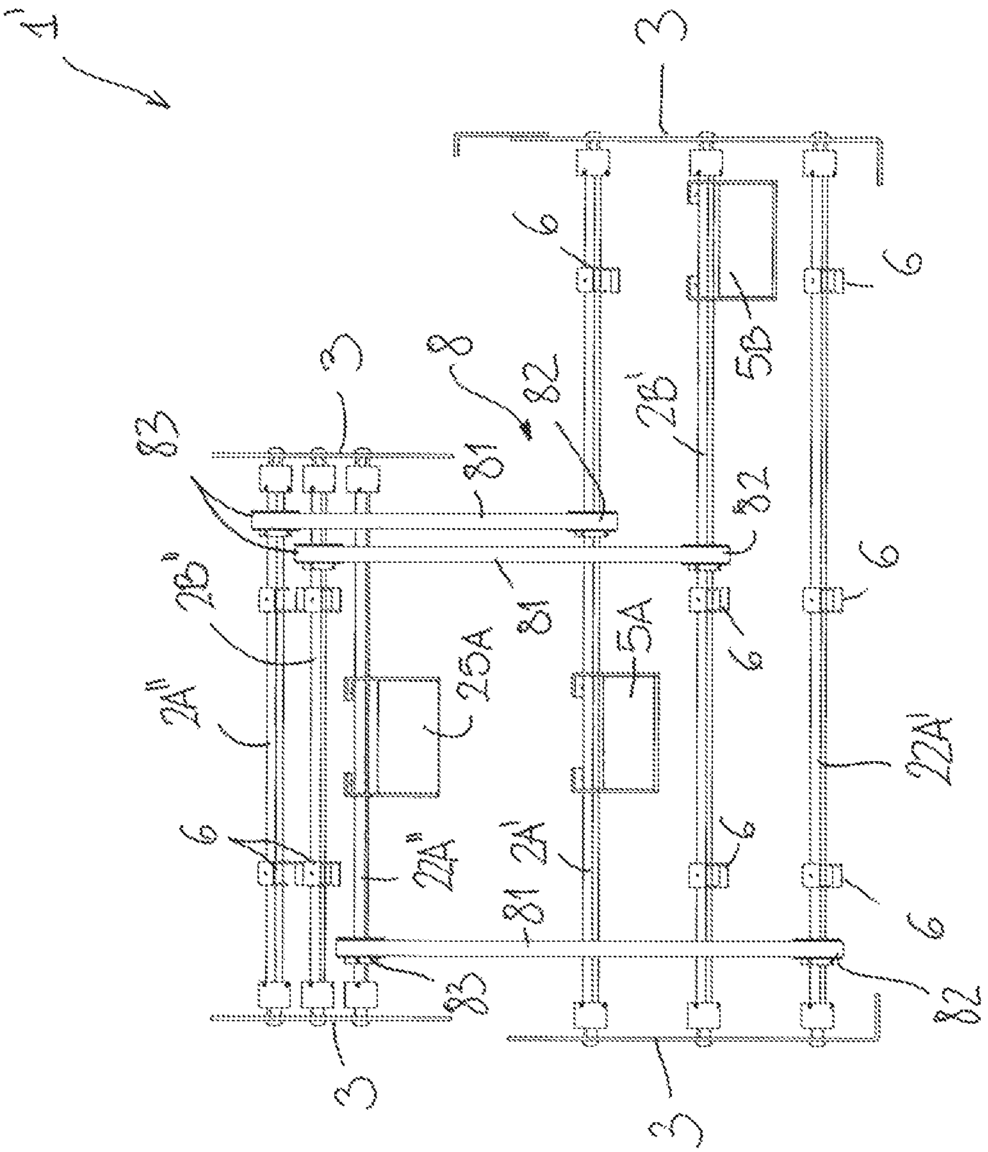
FIGS. 4A and 4B show—with front and perspective views respectively—an assembly for the selective locking according to a second embodiment of the present invention.
Figure 4B:
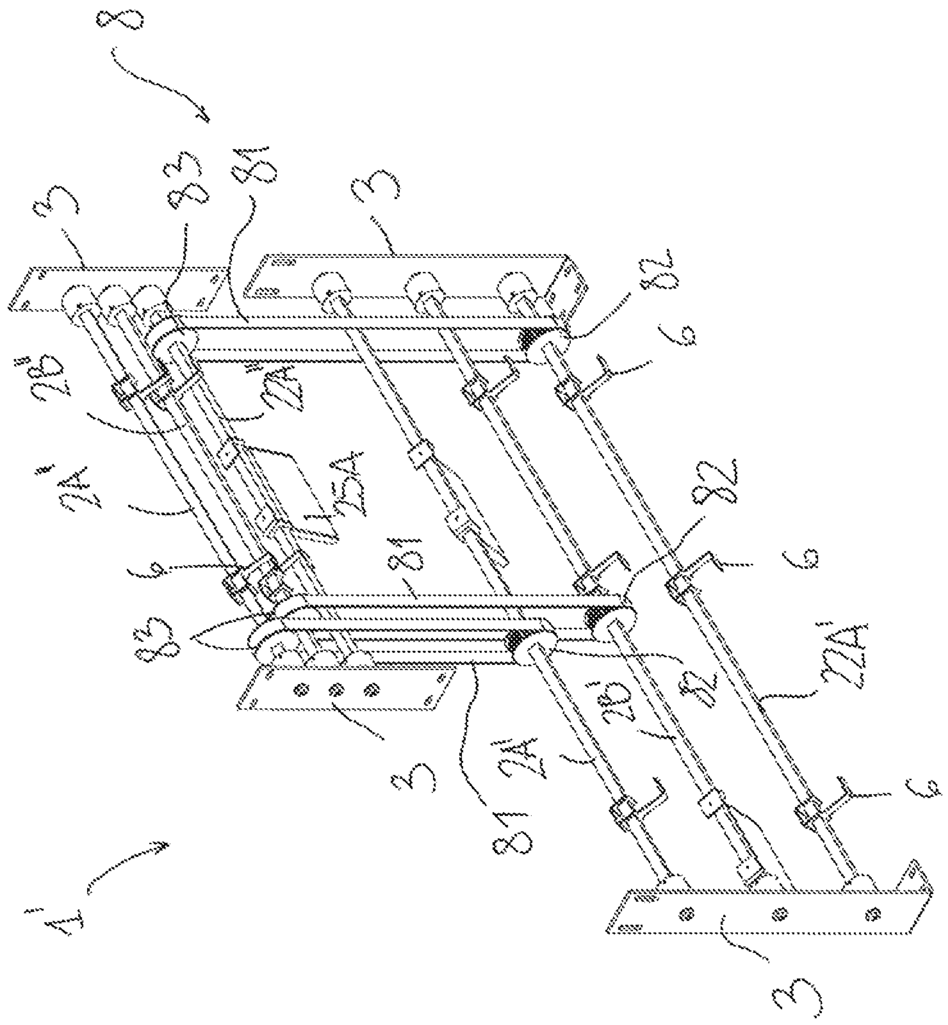
Figure 5:
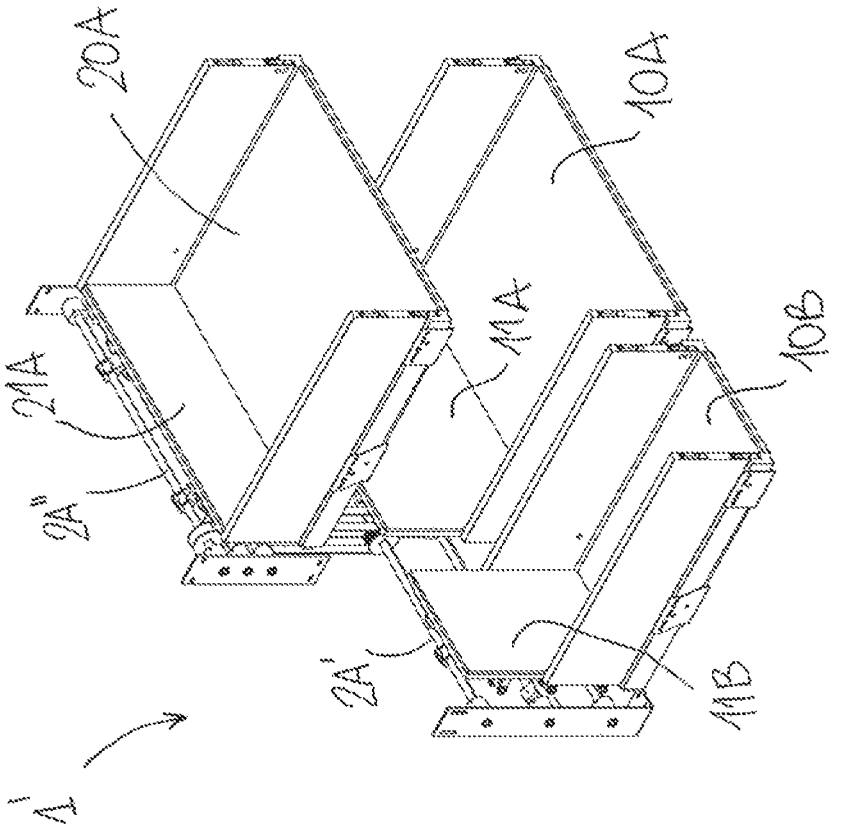
FIG. 5 shows—with perspective view—the locking assembly according to FIGS. 4A and 4B associated with a plurality of extractable components arranged side by side as well as superimposed.

FIGS. 4A, 4B and 5 show a selective locking assembly 1' according to a second embodiment of the invention, configured to be associated with a plurality of drawers arranged on several rows.

In particular, said assembly 1' is adapted to selectively block the extraction of a pair of drawers 10A, 10B directly arranged side by side and arranged on a first row, and of a drawer 20A arranged on a second row, that is superimposed on one of the two drawers belonging to the first row, for a total of three extractable drawers.

Even in this embodiment, each drawer is associated with a corresponding actuating means, and each actuating means is formed by rigid and elongated elements, such as bars or rods arranged horizontally, in a number equal to the number of rows on which said drawers are arranged: in other words, a number of bars equal to the number of drawers whose opening is designed to selectively block, is provided for on each row.

In the specific example, each drawer 10A, 10B, 20A is associated with a corresponding actuating means 2A, 2B, 22A and each actuating means 2A, 2B, 22A is formed by two bars 2A', 2A", 2B', 2B", 22A', 22A", so that there are three bars arranged at the rear part of the drawers 10A, 10B belonging to the first row and three bars arranged at the rear part of the drawer 20A of the second row.

The bars—which form a single actuating means—arranged on different rows, are then advantageously operatively coupled two by two using drive means 8, so that the axial rotation of one of the two connected bars drives even the other one in a simultaneous and matching rotation. Basically, through said drive means 8 two connected bars essentially operate as a single actuating means.

Advantageously, said drive means 8 comprise a pair of pulleys 82, 83 each mounted integrally joined with a bar of the pair of bars to be coupled, and a drive element 81, such as a toothed or grooved belt, which extends between said pair of pulleys 82, 83 and it is wound therearound, so that the rotation of a bar causes the simultaneous rotation of the other one.

Similarly to the previous embodiment, on each actuating means 2A, 2B, 22A, at the drawer 10A, 10B, 20A associated therewith, there is provided for a relative abutment plate 5A, 5B, 25A, arranged and configured to interact with a reference pin (not shown) mounted integrally joined with the relative drawer 10A, 10B, 20A and protruding from the back wall thereof.

The operation of an assembly 1' according to this second embodiment of the present invention is essentially similar to that of the first embodiment.

Figure 6:
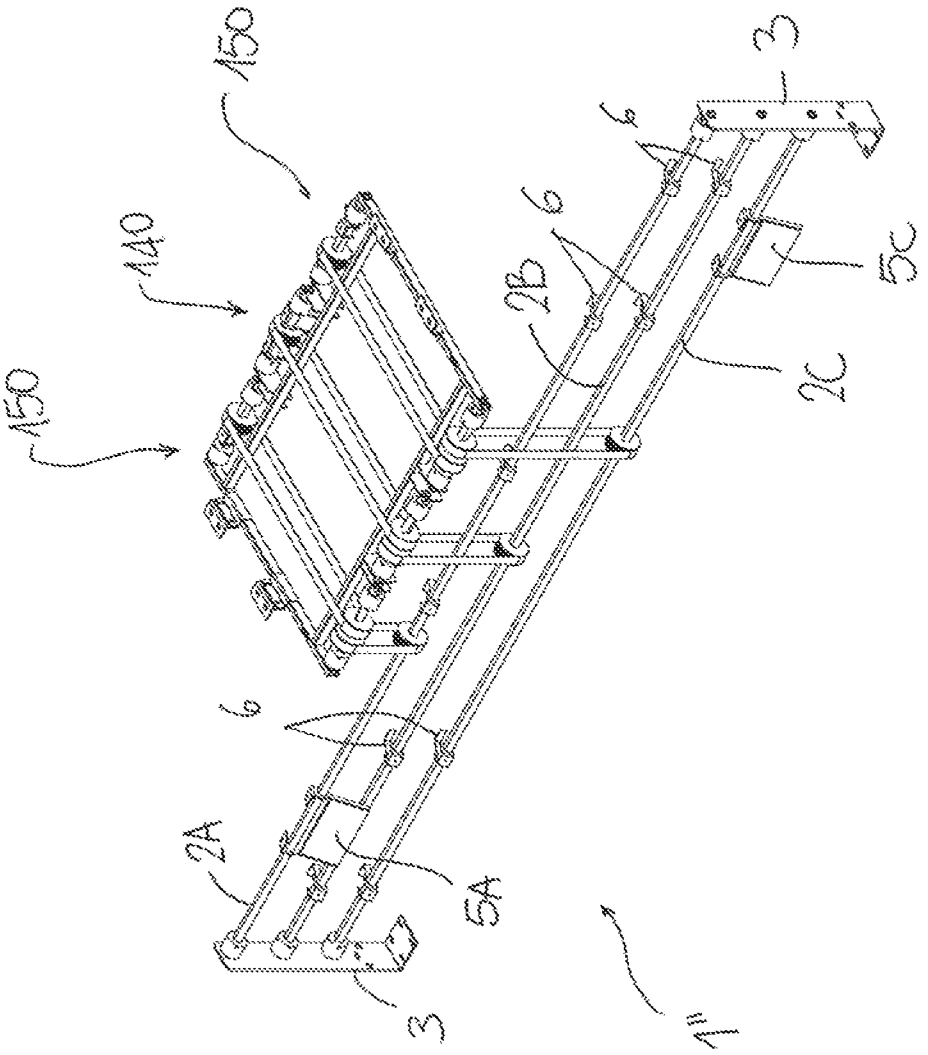
FIG. 6 shows—with a rear perspective view—a selective locking assembly according to a third embodiment of the invention.
Figure 7:
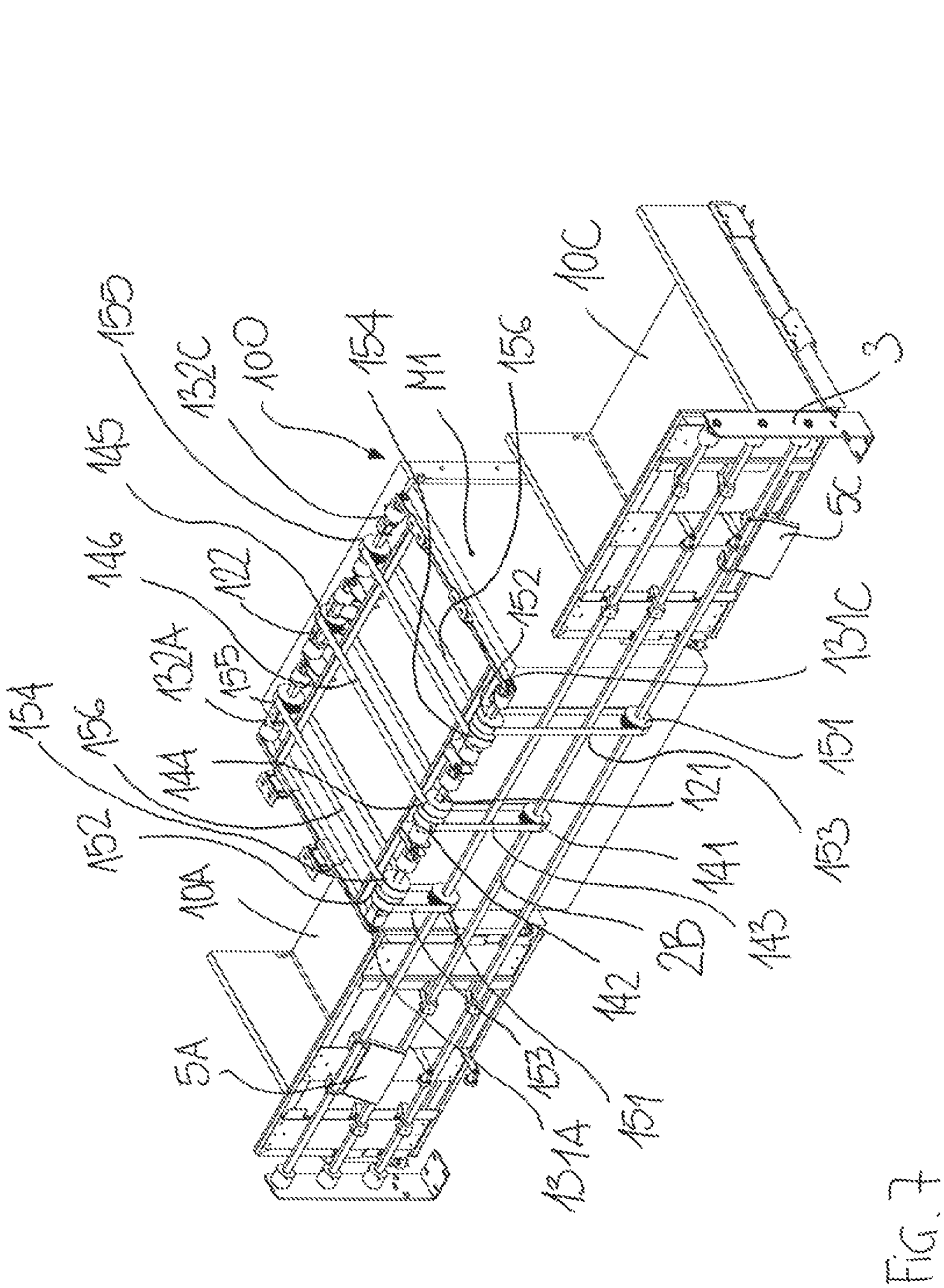
FIGS. 7 and 8 show—with a perspective and top view respectively—the locking assembly according to FIG. 6 associated with a pair of extractable components, with an extractable component contained in a specific casing arranged between them.
Figure 8:
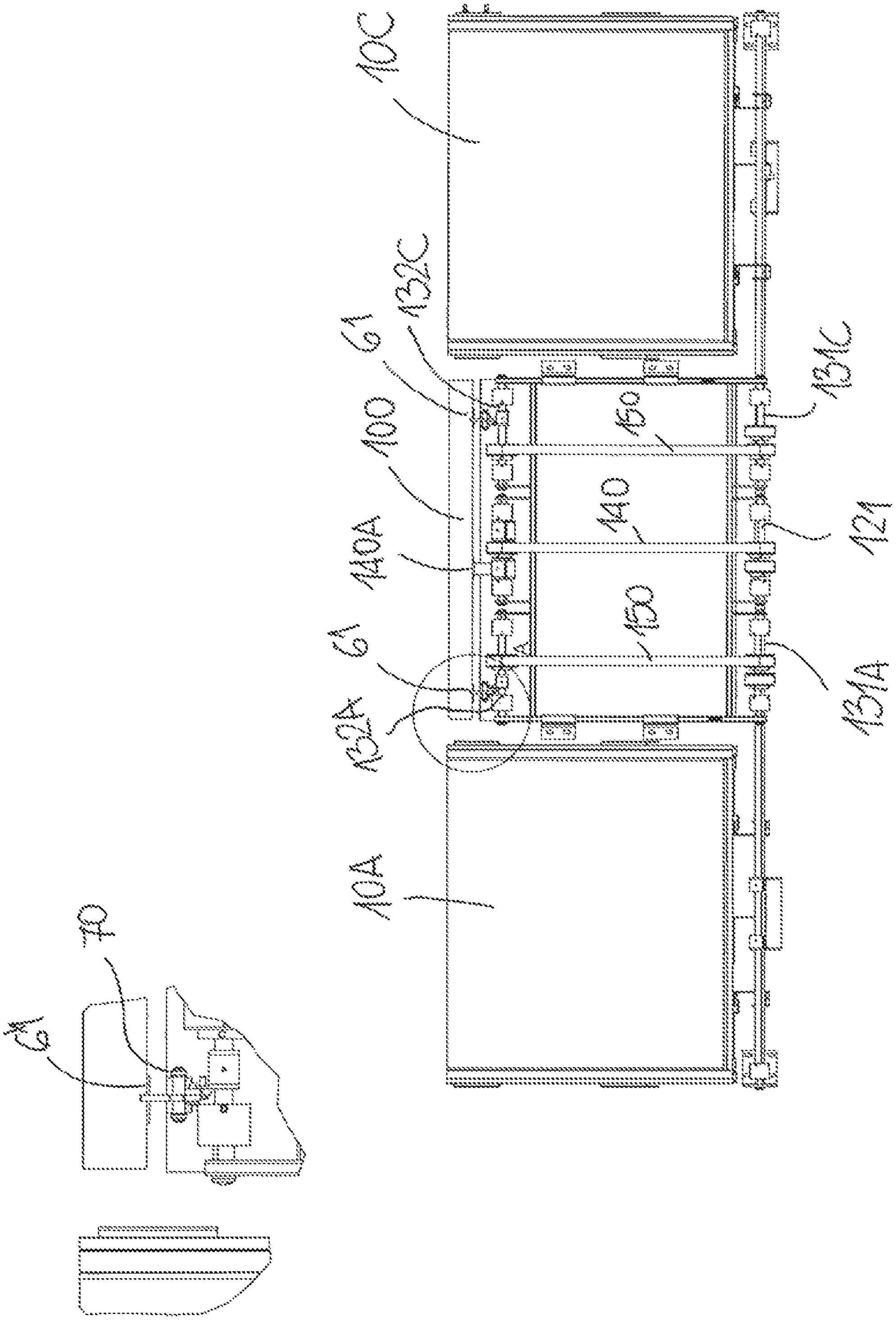
Figure 9:
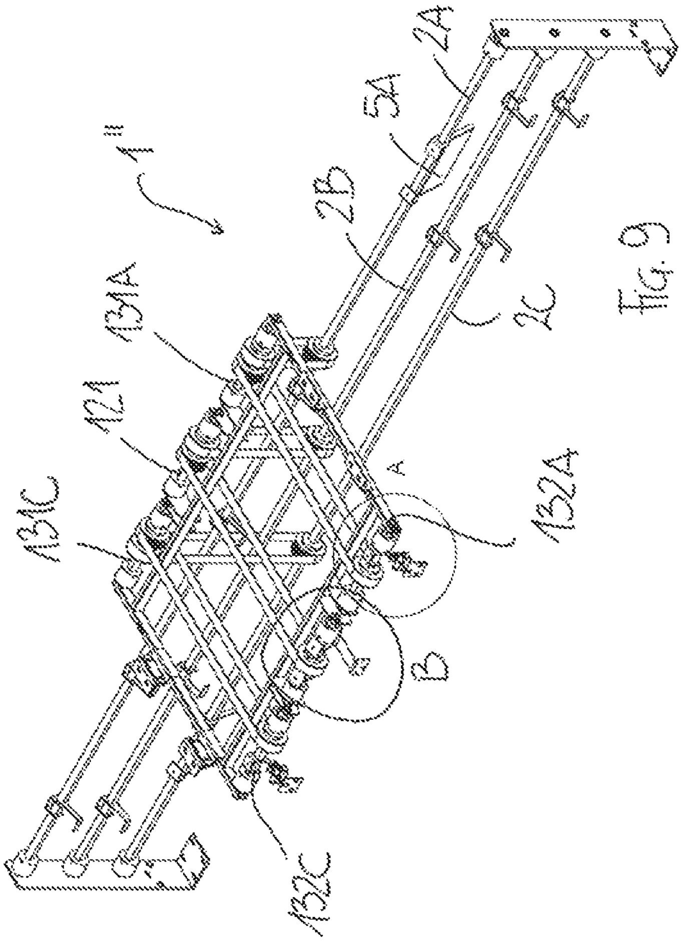
FIG. 9 shows, with a front perspective view, the selective locking assembly according to FIG. 6.

FIGS. 6 and 9 show a selective locking assembly 1" according to a third embodiment of the present invention, adapted to be applied to a pair of extractable components 10A, 10C arranged side by side on the same row, and to a drawer 100, arranged side by side or interposed thereto, contained in a specific casing M1 provided with a fixed back wall, as illustrated in FIGS. 7 and 8. Said drawer 100 comprises at least one front door leaf through which it can be extracted from said casing M1.

For example, said element 100 may be formed by a drawer refrigerator, contained in the relative box-like casing and embedded in a structure of a piece of furniture provided with other drawers arranged side by side on the same row, whose extraction determines a displacement of the barycentre of the piece of furniture such to be able to cause the tilting thereof.

In this case, said drawer 100 is advantageously operatively associated with the relative actuating means 2B using suitable second coupling means 140 which extend beyond said casing M1 and they are preferably supported by the structure of the piece of furniture for example through appropriate brackets.

In particular, as shown in FIGS. 7 and 8, said second coupling means 140 preferably comprise a first pair of pulleys 141, 142 between which there extends a first transmission element 143, such as a toothed or grooved belt, to operatively connect the actuating means 2B associated with said drawer 100 to a first coupling transmission element 121, such as a horizontal bar mounted freely rotatable and preferably arranged on the same vertical plane on which the actuating means 2A, 2B, 2C are arranged, advantageously above the upper surface of the casing M1.

Said second coupling means 140 further comprise a second pair of pulleys 144, 145 between which there extends a second drive element 146, such as a toothed or grooved belt, to operatively connect said first coupling transmission element 121 to a second coupling transmission element 122, such as a horizontal bar, mounted freely rotatable at a front and upper part of the casing M1.

Figure 9A:
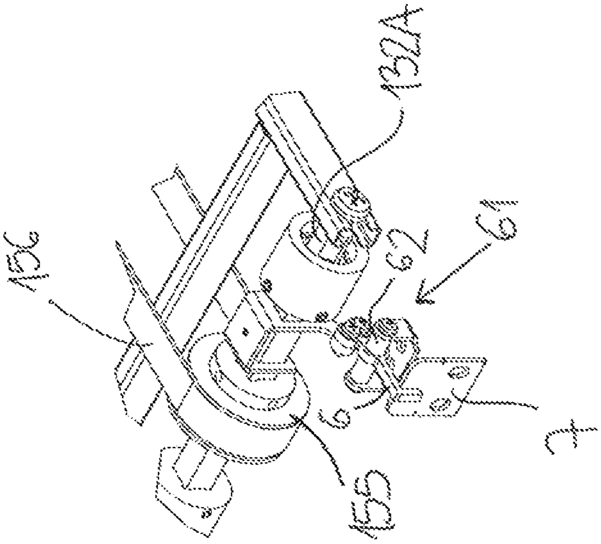
FIGS. 9A and 9B show—with enlarged views—the details circled in FIG. 9.
Figure 9B:
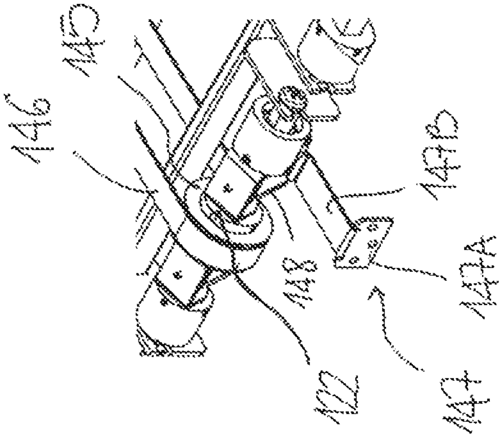

As better observable in FIG. 9B, said second coupling means 140 further comprise a reference member 147, advantageously associated with the door leaf of the drawer 100 and adapted to selectively cooperate with an abutment body 148 mounted integrally joined on said second coupling transmission element 122.

In particular, said reference member 147 preferably comprises a fixing plate 147A which can be constrained to the inner surface of the door leaf of the drawer 100 and a pin 147B perpendicularly protruding therefrom perpendicularly and adapted to abut against said abutment body 148 maintaining the latter inclined with respect to a vertical plane, when said drawer 100 is in the retracted position in the casing M1 thereof.

When the drawer 100 is extracted, said reference pin 147B is detached from the abutment body 148, which moves—by gravity—to rest along a vertical plane, therefore driving also said second coupling transmission element 122 on which it is constrained in rotation; the latter, through said second coupling means 140 rotatably displaces—in a simultaneous and matching fashion—the first coupling transmission element 121 and the actuating means 2B associated with the drawer 100, therefore moving the relative stop means 6 mounted thereon from the disengagement position to the engagement position, in which they interact with the engaging means 7 provided for on the other drawers 10A, 10C, preventing the extraction thereof.

When the drawer 100 is returned to the retracted position, the reference pin 147B once again pushes said abutment body 148 carrying it to an inclined position and therefore imparting a rotation in the direction opposite to the second coupling transmission element 122 which—through said second coupling means 140—rotatably displaces—in a simultaneous and matching fashion—the first coupling transmission element 121 and the actuating means 2B associated with the drawer 100, returning the system to the initial condition.

Further advantageously provided for in this embodiment are transfer means 150, also preferably supported by the structure of the piece of furniture, adapted to displace the stop means 6 connected to the actuating means associated with the drawers 10A, 10C so that they can selectively cooperate with engaging means 7 integrally joined with the door leaf of said drawer 100 when one of said drawers 10A, 10C is extracted to prevent the extraction thereof.

Said transfer means 150 comprise, for each actuating means 2A, 2C associated with the drawers 10A, 10C, a first pair of drive pulleys 151, 152 between which there extends a first transmission element 153, such as a toothed or grooved belt, to operatively connect the actuating means 2A, 2C to a corresponding first transfer transmission element 131A, 131C, such as a horizontal bar mounted freely rotatable and preferably arranged on the same vertical plane on which the actuating means 2A, 2B, 2C are arranged above the upper surface of the casing M1. Advantageously, said first transfer transmission elements 131A, 131C are provided for coaxial to said first coupling transmission element 121.

Said transfer means 150 further comprise a second pair of pulleys 154, 155 between which there extends a second transmission element 156, such as a toothed or grooved belt, to operatively connect said first transfer transmission elements 131A, 131C to a respective second transfer transmission element 132A, 132C, such as a horizontal bar, mounted freely rotatable at the front and upper part of the casing M1. Advantageously, said second transfer transmission elements 132A, 132C are provided for coaxial to said second coupling transmission element 122 and parallel to said transfer transmission elements 131A, 131C and said first coupling transmission element 121.

As better observable in FIG. 9A, said stop means 6 comprise an L-shaped element operatively associated with the corresponding second transfer transmission element 132A, 132C preferably through appropriate drive means 61, for example comprising a connecting rod, so as to rotatably move between a disengagement position, wherein they do not interact with the door leaf of the drawer 100, therefore allowing the extraction thereof, and an engagement position, wherein they block the extraction thereof.

Advantageously, said stop means 6 are adapted to selectively cooperate, through a rotation around a horizontal support shaft 62, with engaging means 7 provided for on the door leaf of the drawer 100, for example formed by a plate constrained to the inner surface of the door leaf 100 and protruding vertically therefrom to prevent/allow the extraction of the drawer 100.

Therefore, when one of the drawers 10A, 10C is extracted, for example the drawer 10A, the relative actuating means 2A oscillates due to said first coupling means 40, rotatably carrying said stop means 6, both those directly mounted thereon and those operatively connected thereto through said transfer means 150, in the engagement position, in which they prevent the extraction of the other drawer 10C and of the drawer 100, for example engaging the engaging means 7 provided for at the back 11C of the drawer 10C and on the door leaf of the drawer 100.

When the previously extracted drawer 10A is returned to the retracted position, the first coupling means 40 return the corresponding actuating means 2A to the former position; such movement rotates the stop means 6—both those directly mounted thereon and those operatively connected thereto through said transfer means 150—to the disengagement position, therefore returning to the initial condition wherein the extraction of any one of the drawers 10A, 10C, 100 is allowed.

In the light of the above, it is clear that the present invention attains the objects and advantages initially set forth: as a matter of fact, there has been devised an assembly for the selective locking of extractable components such as drawers for example for pieces of furniture which allows the extraction of a single drawer at a time and which is flexible to the uttermost, being capable of adapting to use on pieces of furniture provided with a plurality of drawers or baskets, arranged side by side, or even possibly superimposed or embedding extractable household appliances such as refrigerators or other.

It should be observed that in the description above, positional or directional terms such as "above, below, vertical, horizontal, lower and upper", same case applying to any other similar term, shall be interpreted with reference to a selective locking assembly in the normal operative configuration thereof, as shown in the attached drawings.

Obviously, the present invention is susceptible of numerous applications, modifications or variations without departing from the scope of protection, as defined in the attached claims.

Furthermore, the materials and equipment used to implement the present invention, as well as the shapes and dimensions of the individual components, may be the most suitable depending on the specific requirements.

The invention claimed is:

1. A selective locking assembly of extractable components, including several drawers, arranged side by side on a first row and adapted to be displaced along a horizontal direction between a retracted position and an extracted position with respect to a containing structure, the selective locking assembly being adapted for preventing the simultaneous extraction of more than one of the several drawers, and comprising at least a pair of actuating means each formed by at least one rigid elongated element extending horizontally and arranged so as to be axially rotatable in proximity to a back wall of at least one of the several drawers, each actuating means being operatively associable with a corresponding one of the several drawers through first coupling means and being also equipped, in correspondence with another of the at least one of the several drawers, with stop means configured and arranged for selectively cooperating with the another of the at least one of the several drawers to prevent/allow their extraction, each actuating means being adapted to be rotatably displaced, in response to the extraction movement of the drawer to which it is associated, from a first position, wherein the stop means allow the extraction of any one of the another of the at least one of the several drawers, to a second position, wherein the stop means interact with the another of the at least one of the several drawers thereby preventing their extraction, wherein the first coupling means comprise a reference member formed of a pin projecting from a rear surface of the back wall of the relative drawer and an abutment body rigidly mounted on the respective actuating means and arranged so as to interact with the reference pin in order to rotatably displace the actuating means between the first and the second position, and wherein the stop means comprise L-shaped elements adapted to selectively cooperate with engaging means provided on the another of the at least one of the several drawers.

2. The selective locking assembly according to claim 1, wherein the actuating means are provided in a number equal to the number of the drawers of which it is intended to selectively lock the extraction movement of the drawers.

3. The selective locking assembly according to claim 1, wherein the actuating means lie on a same vertical plane.

4. The selective locking assembly according to claim 1, wherein the abutment body comprises a rigid plate cantilevered mounted onto the relative actuating means.

5. The selective locking assembly according to claim 1, wherein on a free end of the reference pins a magnet is provided, the magnet being adapted to magnetically interact with the material forming the abutment body.

6. The selective locking assembly according to claim 1, wherein at least one additional drawer arranged on a second row, located above the first row is provided, each actuating means being formed by elongated rigid elements provided in a number equal to the number of the rows on which all of the drawers are arranged, so that on each row there is provided a number of elongated rigid elements equal to the number of drawers of which it is intended to selectively block the extraction movement of the drawers, the elongated rigid elements arranged on different rows and forming a single actuating means being operatively coupled through relative drive means.

7. The selective locking assembly according to claim 6, wherein the drive means comprise a pair of pulleys each rotatably mounted integral with an elongated rigid element of a pair of elongated rigid elements to be coupled, and a drive element which extends between the pair of pulleys and is wound around them, such that the rotation of an elongated rigid element involves the simultaneous rotation of the other.

8. The selective locking assembly according to claim 1, wherein at least one cased drawer is also provided which can be extracted with respect to a casing arranged side by side or interposed with respect to at least a pair of drawers, the assembly comprising second coupling means, configured for associating the at least one cased drawer to a relative actuating means, and transfer means configured for operating the stop means to selectively cooperate with the at least one cased drawer to allow/prevent its extraction.

9. The selective locking assembly according to claim 8, wherein the second coupling means comprise a first coupling transmission element formed by a horizontal bar extending above a top surface of the casing, operatively connected to the actuating means by means of a first pair of pulleys and a first transmission element, a second coupling transmission element formed by a horizontal bar extending at a top front part of the casing and operatively connected to the first coupling transmission element by means of a second pair of pulleys and a second transmission element, the second coupling means further comprising a reference member integral with a door of the at least one cased drawer and an abutment body rigidly mounted on the second coupling transmission element.

10. The selective locking system according to claim 8, wherein the transfer means comprise, for each of the at least one cased drawer, a first transfer transmission element, formed by a horizontal bar extending above a top surface of the casing, operatively connected to the corresponding actuating means by means of a first pair of pulleys and a first transmission element, a second transfer transmission element formed by a horizontal bar extending at a top front part of the casing operatively connected to the first transfer transmission element by means of a second pair of pulleys and a second transmission element, the stop means being rotatably associated with the second transfer transmission element.

11. The containing structure comprising the selective locking assembly according to claim 1.

* * * * *